US012637562B2

(12) United States Patent
     Hemond

(10) Patent No.: US 12,637,562 B2
(45) Date of Patent: May 26, 2026

(54) ELECTRICAL CONNECTOR USING NON-HALOGENATED FLAME RETARDANT POLYMER COMPOSITION

(71) Applicant: TE Connectivity Solutions GmbH, Schaffhausen (CH)

(72) Inventor: Jessica H. B. Hemond, Mifflintown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 770 days.

(21) Appl. No.: 18/145,430

(22) Filed: Dec. 22, 2022

(65) Prior Publication Data

US 2024/0209199 A1      Jun. 27, 2024

(51) Int. Cl.
     *C08L 33/08*      (2006.01)
     *B33Y 10/00*      (2015.01)
     *C08K 3/34*      (2006.01)
     *C08K 3/38*      (2006.01)

(52) U.S. Cl.
     CPC .............. *C08L 33/08* (2013.01); *B33Y 10/00* (2014.12); *C08K 3/346* (2013.01); *C08K 3/38* (2013.01); *C08K 2003/387* (2013.01); *C08L 2201/02* (2013.01); *C08L 2201/22* (2013.01); *C08L 2203/20* (2013.01)

(58) Field of Classification Search
     CPC .. C08L 33/08; C08L 2201/02; C08L 2201/22;
     C08L 2203/20; B33Y 10/00; B33Y 70/10;
     B33Y 80/00; C08K 3/346; C08K 3/38;
     C08K 2003/387; C08K 3/016; C08K
     3/34; C08K 5/0066; H01R 13/527; H01R
     13/6273; H01R 43/18
     See application file for complete search history.

(56) References Cited

U.S. PATENT DOCUMENTS

2004/0190841 A1 * 9/2004 Anderson ............ G02B 6/3897
                                                        385/100
2014/0309344 A1 * 10/2014 Yu ........................ C08K 5/5205
                                                        524/100

OTHER PUBLICATIONS

Babu et al., "Fire Behavior of 3D-Printed Polymeric Composites", JMEPEG, vol. 30:4745-4755, Mar. 30, 2021.
Zheng et al., "Loading an organophosphorous flame retardant into halloysite nanotubes for modifying UV-curable epoxy resin", Royal Society of Chemistry, RSC Advances, vol. 6, 57122, May 26, 2016.

* cited by examiner

*Primary Examiner* — James C Yager

(57) ABSTRACT

An electrical connector having a housing formed of a non-halogenated flame retardant polymer composition is described. The non-halogenated flame retardant polymer composition is formulated to meet flammability performance requirements while maintaining a balance of flexibility and stiffness to allow for the connector to operate properly.

10 Claims, 2 Drawing Sheets

ELECTRICAL CONNECTOR USING NON-HALOGENATED FLAME RETARDANT POLYMER COMPOSITION

FIELD OF THE INVENTION

The present invention relates to a non-halogenated flame retardant polymer composition used in an electrical connector. In particular, the invention is directed to a non-halogenated flame retardant polymer composition which has the flammability and mechanical performance required for an electrical connector made in an additive manufacturing process.

BACKGROUND OF THE INVENTION

In the electronics industry, electrical components such as connectors are used in many different applications. Safety is a key goal with such components, especially in the home appliance industry. Due to the possibility of improper human usage, over-current, or short circuit failures within wired electrical components, fire protection requirements were created to determine the flammability of such components.

Fire protection requirements have been created by industry to evaluate and rate the flammability of components used in the electronics industry. Historically, a number of different methods have been developed to evaluate material flammability and fire resistance. These methods provide a way to compare the component's tendency to resist ignition, self-extinguish flames (should ignition possibly occur) and to not propagate fire. Examples of tests used to measure flammability are the glow wire tests of IEC 60695-2-11 (Edition 2.0; 2021) and IEC 60695-2-13 (2021).

The glow wire test of IEC 60695-2-11 is used when the glow wire testing is performed on the end product. Glow wire testing is performed by heating an element to a pre-determined temperature. The sample to be tested is fixed in place and tissue paper is positioned below the sample. After reaching the pre-determined temperature, the heating element is then pressed into the sample material under a nominal set force of 1N for 30 seconds. The sample passes the test if it does not ignite or if it self-extinguishes within 30 seconds after removal of the heated element. Also, the sample may not ignite the tissue paper if dripping occurs.

IEC 60695-2-13 is applied to test specimens of solid materials for ignitability to determine the glow wire ignition temperature (GWIT). The GWIT is the temperature which is 25° K (30° K for 900° C. and 930° C.) higher than the maximum test temperature at which three test specimens at the relevant thickness do not ignite or if sustained flaming combustion does not occur for a time longer than 5 seconds for any single flame event and the specimen is not totally consumed.

However, various difficulties are encountered in achieving desired flammability and fire resistance targets when using 3D printing or additive manufacturing to produce the housings and components of electrical connectors.

Three-dimensional printing or additive manufacturing has become increasingly popular over the past several decades as a means of manufacturing prototypes as well as end user production products. As the range of 3D products has become diverse, interest in developing printable materials that exhibit flammability and fire resistance has increased. Nonetheless, the technology is still constrained as the product of a 3D printer is restricted by one or more of the materials that are combined into a given product.

Two known techniques used in three-dimensional printing are stereolithography (SLA) and digital light projection (DLP). Both of these techniques are based upon photopolymerization. The strategy of these two methods is based upon light irradiation of a reservoir filled with photocurable materials Current photocurable polymer compositions do not allow for obtaining products that have satisfactory or desired flammability and fire resistance. Thus, there is a need for a non-halogenated flame retardant polymer composition which has high elongation, good stability, toughness, good viscosity, and meets the high performance glow wire tests of IEC 60695-2-11 and IEC 60695-2-13. The non-halogenated flame retardant polymer can be used to make end products such as electrical connectors using additive manufacturing processes. The non-halogenated flame retardant polymer composition can be used in an electrical connector, preferably the latch of such a connector.

SUMMARY OF THE INVENTION

An embodiment is directed to an electrical connector having a housing formed of a non-halogenated flame retardant polymer composition. The non-halogenated flame retardant polymer composition meets flammability performance requirements while maintaining a balance of flexibility and stiffness to allow the connector to operate properly.

An embodiment is directed to a non-halogenated flame retardant polymer composition comprising a resin, a non-halogenated flame retardant, synergist, and a charring agent.

An embodiment is directed to a non-halogenated flame retardant polymer composition which can be printed and used in an additive manufacturing process.

A further embodiment is directed to a component of an electrical connector, such as for example, a connector housing with a latch, made from a non-halogenated flame retardant polymer composition comprising a resin, a non-halogenated flame retardant, and a charring agent.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
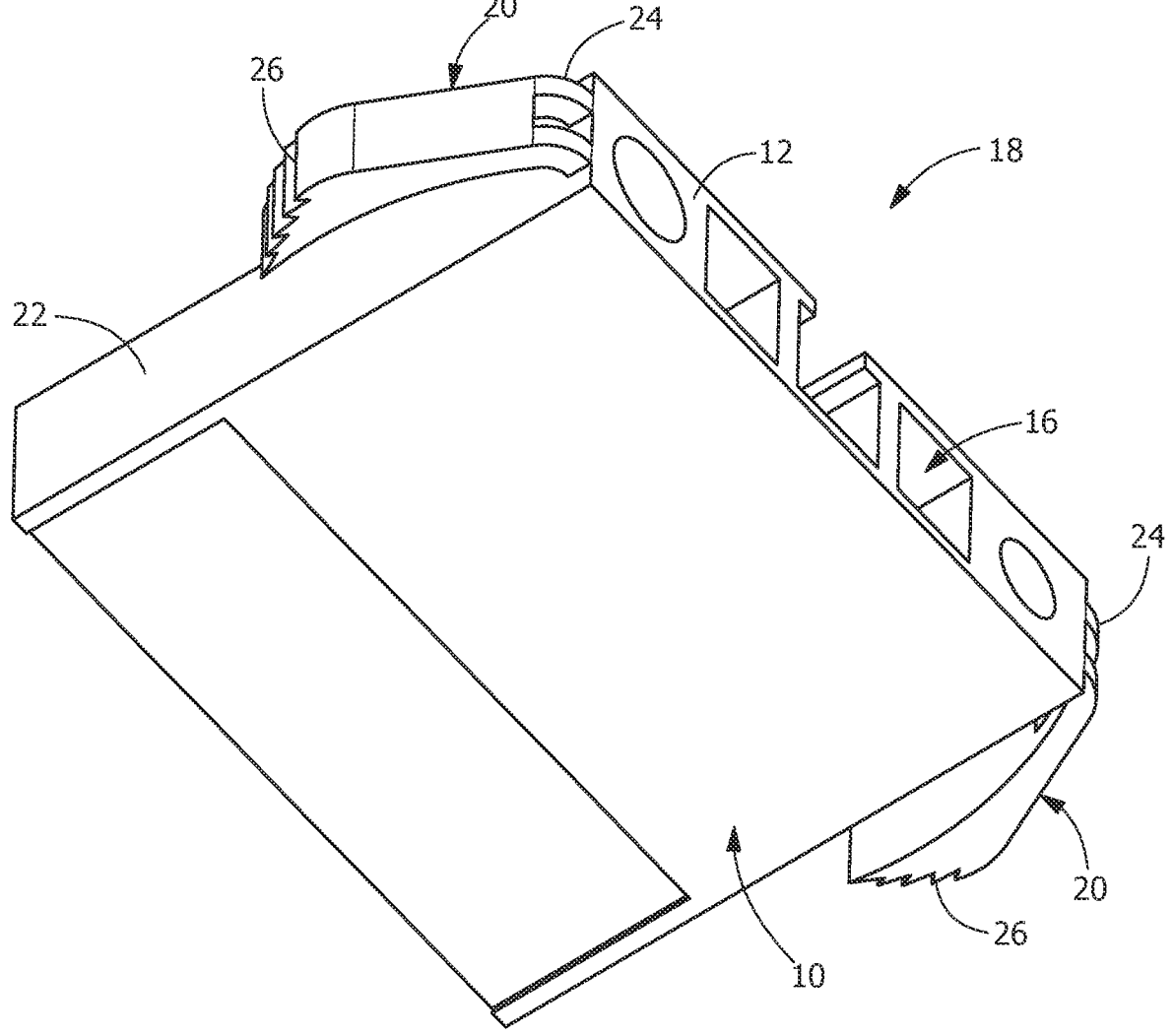
FIG. 1 is a perspective view of an illustrative electrical connector housing with a latch. The electrical connector is made from the non-halogenated flame retardant polymer composition of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom"

as well as derivative thereof (e.g., "horizontally," "down-wardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
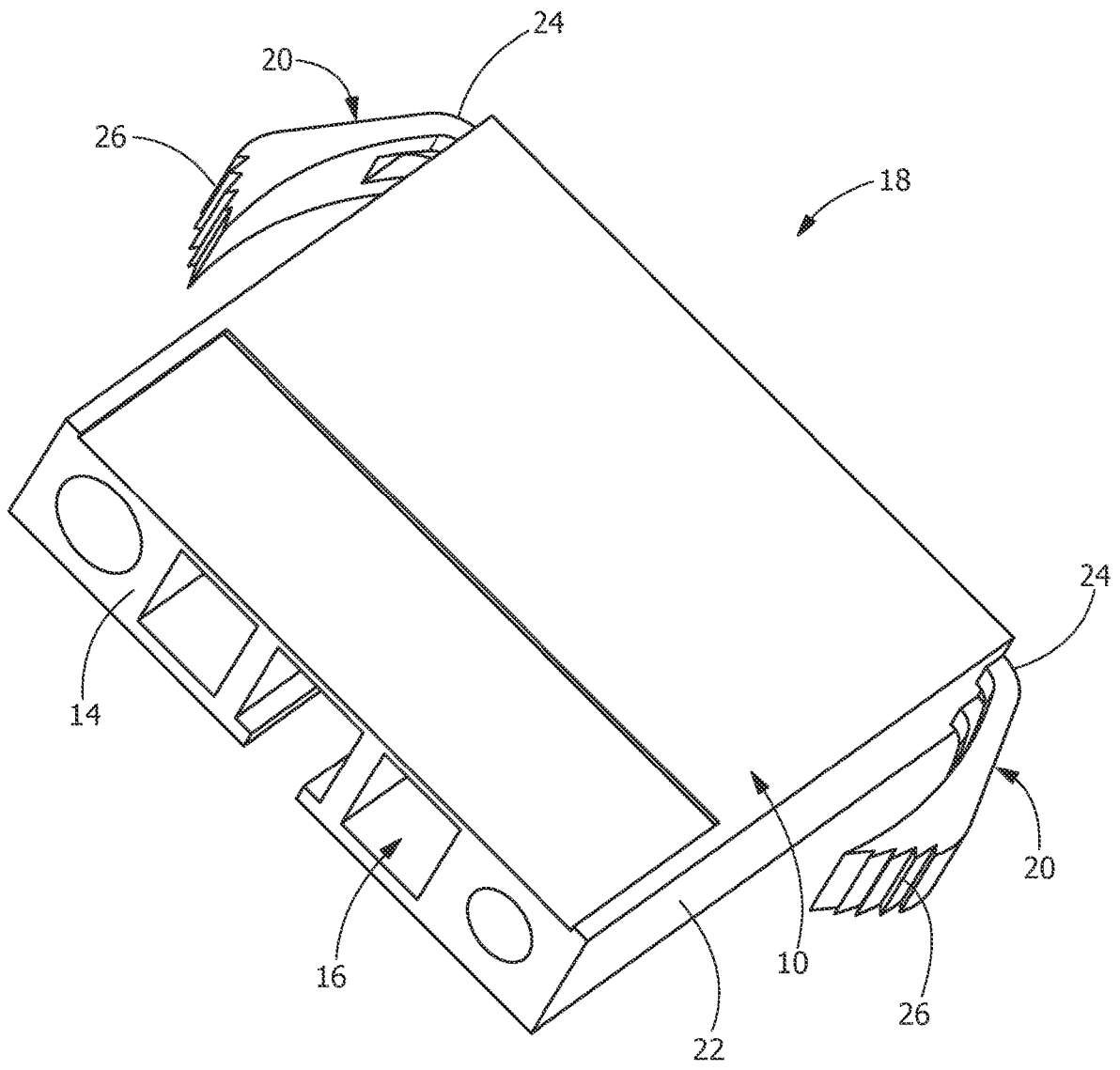
FIG. 2 is a back perspective view of the illustrative electrical connector housing of FIG. 1.

As shown in FIGS. 1 and 2, an illustrative electrical connector 18 has a connector housing 10 made from a non-halogenated flame retardant polymer composition. The connector housing 10 is meant to be an illustrative embodiment, as the use of the non-halogenated flame retardant polymer composition can be used for connector housings of various configurations.

The illustrative connector housing 10 has a first or front surface 12 and an oppositely facing second or back surface 14. Terminal receiving cavities 16 extend from the front surface 12 to the back surface 14. The terminal receiving cavities 16 are dimensioned to receive terminals (not shown) therein.

Latches 20 extend from side surfaces 22 of the connector housing 10. The latches 20 may be made from the same non-halogenated flame retardant polymer composition as the connector housing 10. The latches 20 have fixed ends 24 which are integral with the side surfaces 22. Free ends 26 of the latches 20 are movable relative to the side surfaces 22 to allow the latches 20 and the connector housing 10 to be mated and secured to a mating connector housing (not shown). The illustrated latches 20 are merely illustrative examples of the types of latches that can be used with connector housings. For example, the latches may be positioned on the outside of the housing to secure the housing to a mating housing. Alternatively, the latches may be provided in terminal receiving openings of the housing to secure terminals in the terminal receiving openings of the housing. The operation of the latches will not be described in greater detail, as the operation of the latches is known to those skilled in that art.

As the connector housing 10 is mated with a mating connector, the latches 20 are moved from an unstressed position to a stressed position. As this occurs, the latches are resiliently deformed to allow mating to occur. The latches 20 must have sufficient flexibility to deflect without breakage, Once the connector housing 10 and the mating connector are properly mated, the latches 20 are returned toward the unstressed position, thereby securing the connector housing 10 and the mating connector in a mated position. As the latches 20 return toward the unstressed position, the latches 20 must retain enough stiffness to provide a sufficient retaining force against the mating connector to prevent the unwanted removal for the connector housing 10 from the mating connector. The latches 20 must have sufficient flex-ibility and strength to allow the movement of the latches 20 without failure. The use of the non-halogenated flame retardant polymer composition provides the flexibility and strength requirements to allow for the movement of the latches 20 without failure. The use of the non-halogenated flame retardant polymer composition does not degrade the mechanical performance of the latches 20 or the connector housing 10.

In other embodiments, in which the latches (not shown) are provided in terminal receiving cavities 16 of the housing 10 to secure terminals in the terminal receiving cavities 16 of the housing 10, the latches are moved from an unstressed position to a stressed position as the terminals are inserted into the terminal receiving cavities 16. As this occurs, the latches are resiliently deformed to allow the terminals to be inserted. The latches must have sufficient flexibility to deflect without breakage. Once the terminals are properly positioned in the terminal receiving cavities 16 of the connector housing 10, the latches are returned toward the unstressed position, thereby securing the terminals in the terminal receiving cavities 16 of the connector housing 10. As the latches return toward the unstressed position, the latches must retain enough stiffness to provide a sufficient retaining force against the terminals to prevent the unwanted removal of the terminals from the terminal receiving cavities 16 of the connection housing 10. The latches must have sufficient flexibility and strength to allow the movement of the latches without failure. The use of the non-halogenated flame retardant polymer composition provides the flexibility and strength requirements to allow for the movement of the latches without failure. The use of the non-halogenated flame retardant polymer composition does not degrade the mechanical performance of the latches or the connector housing 10.

The use of the non-halogenated flame retardant polymer composition is compatible with known manufacturing pro-cesses, including, but not limited to, additive manufacturing processes. The use of the non-halogenated flame retardant polymer composition allows for the connector housing 10 and latches 20 to meet flammability performance require-ments (such as, but not limited to glow wire performance requirements) while maintaining a balance of flexibility and stiffness to allow for the latches 20 to operate properly.

The non-halogenated flame retardant polymer composi-tion of the instant invention comprises a resin, a non-halogenated flame retardant, a synergist, and a charring agent. Optionally, depending upon the use of the non-halogenated flame retardant, additional additives can be included in the composition.

Examples of resins that can be used in the non-haloge-nated flame retardant polymer composition include but are not limited to acrylates, acrylate epoxies, olefins, epoxies, and cyanate ester based photopolymers. When the compo-sition comprises a photopolymer, depending upon the pho-topolymer that is used, a photoinitiator or a photoinitiator system may already be contained within the photopolymer or may be needed to be added to the non-halogenated flame retardant polymer composition to initiate the photochemical reaction. Such photoinitiator or photoinitiator system would be dependent upon the resin and the specific process used. Common photoinitiators that can be used include but are not limited to: phenylbis(2,4,6-trimethylbenzoyl)phosphine oxide, benzophenone, 1-hydroxy-cyclohexylphenylketone, isopropyl thixanthone, 2-ethyhexyl-(4-N,N-dimethyl amino) benzoate and are commonly found added at 1-5% of base photopolymer. Preferably, the resin has an elongation from about 4 to about 10% after being finally cured as measured by ASTM D638 Alternatively, the test set forth in ISO 527 can also be used to measure the elongation.

The non-halogenated flame retardants to be used in the non-halogenated flame retardant polymer composition can be metal hydroxides, inert minerals, and phosphorus based additives. Additional examples of the non-halogenated flame retardant include but are not limited to: ammonium poly-phosphate, melamine polyphosphate, melamine cyanurate, magnesium hydroxide, aluminum trioxide, red phosphorus, piperazine pyrophosphate, phosphate esters, and combinations thereof. The non-halogenated flame retardant is chosen so that it is compatible with the underlying resin. The non-halogenated flame retardant is compatible with the resin if it can be uniformly dispersed in the resin when mixed as well as when printed, if an additive manufacturing process is used, is stable, does not disrupt the photopolymerization and does not have a detrimental impact on the mechanical properties of the non-halogenated flame retardant polymer composition itself which would render the composition unusable as an electrical connector. The non-halogenated flame retardant comprises about 10 to about 20% by weight of the non-halogenated flame retardant polymer composition.

The non-halogenated flame retardant polymer composition also includes a synergist. Examples of suitable synergists that can be used in the non-halogenated flame retardant polymer composition include but are not limited to zinc borate and antimony trioxide. The synergist comprises about 1% to about 5% by weight of the composition of the non-halogenated flame retardant polymer composition.

In addition to the non-halogenated flame retardant, the non-halogenated flame retardant polymer composition includes a charring agent. An example of a charring agent is clay. A suitable clay includes ADINS Clay 20, an organo-modified high purity, ultrafine and naturally occurring needle-like silicate, based upon quaternary ammonium salt, available from Tolsa. Other charring agents can be used provided that they do not increase the viscosity of the non-halogenated flame retardant polymer composition to the point of making it unprintable. The amount of the charring agent in the non-halogenated flame retardant polymer composition ranges from about 0.04% to about 2% by weight of the non-halogenated flame retardant polymer composition.

Other conventionally employed additives may be added to the non-halogenated flame retardant polymer composition. Examples of conventionally employed additives include pigments, dyes, voiding agents, antistatic agents, foaming agents, plasticizers, radical scavengers, anti-blocking agents, anti-dust agents, antifouling agents, surface active agents, slip aids, optical brighteners, plasticizers, viscosity modifiers, gloss improvers, dispersion stabilizers, UV stabilizers, UV absorbers, antioxidants, lubricity agents, heat stabilizers, hydrolysis stabilizers, cross-linking activators, coupling agents, layered silicates, radio opacifiers, such as barium sulfate, tungsten metal, non-oxide bismuth salts, fillers, colorants, reinforcing agents, adhesion promoters (such as for example, but not limited to, 2-hydroxyethyl-methacrylate-phosphate), impact strength modifiers, and any combination thereof. Such additives may be included in conventional amounts. All additives in the non-halogenated flame retardant polymer composition must be capable of surviving the standard use temperature of any component made from such a composition. Standard use temperatures will be dependent upon the end application but are generally at least 105° C.

In one preferred embodiment of the non-halogenated flame retardant polymer composition, the composition comprises an acrylate, melamine polyphosphate, zinc borate and clay.

The non-halogenated flame retardant polymer composition of the instant invention has good stability. Good stability is determined by no visual indication of the sedimentation of insoluble additives at standard storage temperatures and provides uniform dispersion of various additives throughout the resin. This stability is required for a period of about 10 to about 24 hours comprising the stability needed during the printing operation. For longer term storage the composition must be recoverable in that any sedimentation can be re-dispersed through standard mixing processes. In addition, this non-halogenated flame retardant polymer composition preferably has a viscosity of less than 10,000 CPS using a Brookfield viscometer at 1 rpm and 25° C. Furthermore, the composition has good flammability performance and passes both IEC 60695-2-11 and IEC 60695-2-13 tests. In addition, the non-halogenated flame retardant polymer composition is flexible and tough and exhibits low smoke density.

In another aspect, the invention relates to the preparation of the non-halogenated flame retardant polymer composition. The process comprises providing a resin, providing at least one non-halogenated flame retardant, a synergist and a charring agent. The resin, the non-halogenated flame retardant, the synergist and the charring agent are mixed together in particulate form using any conventional process to mix materials together. The mixing equipment can be any suitable equipment used in the art of mixing concentrated solids. Examples of such suitable equipment include high speed centrifugal mixers, ribbon blenders, shakers, tube rollers and the like.

Although described with respect to electrical connectors, the non-halogenated flame retardant polymer composition can be used for other products formed by additive manufacturing. Desirably, such products should require flammability and mechanical performance.

One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical connector comprising:
a housing formed of a non-halogenated flame retardant polymer composition, the housing having latches;
wherein the non-halogenated flame retardant polymer composition meets flammability performance requirements while allowing the latches to flex without breakage and allowing the latches to provide sufficient retaining forces, wherein the non-halogenated flame retardant polymer composition comprises a resin, which comprises an acrylate photopolymer, a non-halogenated flame retardant, which comprises melamine polyphosphate, a synergist, which comprises zinc borate, and a charring agent, which comprises clay.

2. The electrical connector as recited in claim 1, wherein the latches are configured to cooperate with a mating connector.

3. The electrical connector as recited in claim 1, wherein the housing and the latches are formed from an additive manufacturing process.

4. The electrical connector as recited in claim 1, wherein the resin has an elongation from about 4 to about 10% after final curing.

5. The electrical connector as recited in claim 1, wherein the non-halogenated flame retardant comprises about 10 to about 20% by weight of the non-halogenated flame retardant polymer composition.

6. The electrical connector as recited in claim 1, wherein the synergist comprises about 1% to about 5% by weight of the composition of the non-halogenated flame retardant polymer composition.

7. The electrical connector as recited in claim 1, wherein the clay is an organo-modified high purity, ultrafine and naturally occurring needle-like silicate, based upon quaternary ammonium salt.

8. The electrical connector as recited in claim 1, wherein the charring agent in the non-halogenated flame retardant polymer composition ranges from about 0.04% to about 2% by weight of the non-halogenated flame retardant polymer composition.

9. The electrical connector as recited in claim 1, wherein the non-halogenated flame retardant polymer composition has no sediments present for a period of about 10 to about 24 hours.

10. The electrical connector as recited in claim 1, wherein the non-halogenated flame retardant polymer composition has a viscosity of less than 10,000 CPS using a Brookfield viscometer at 1 rpm and 25° C.

* * * * *